US007618472B2

(12) United States Patent
Agnello et al.

(10) Patent No.: US 7,618,472 B2
(45) Date of Patent: Nov. 17, 2009

(54) VANE-TYPE DEMISTER

(75) Inventors: Joseph Agnello, Grand Island, NY (US); Thomas C. Heldwein, Pendleton, NY (US); Zhanping Xu, Amherst, NY (US); Aaron J. Muck, Clarence, NY (US)

(73) Assignee: UOP LLC, Des Plaines, IL (US)

( * ) Notice: Subject to any disclaimer, the term of this patent is extended or adjusted under 35 U.S.C. 154(b) by 451 days.

(21) Appl. No.: 11/305,068

(22) Filed: Dec. 16, 2005

(65) Prior Publication Data

US 2007/0137154 A1 Jun. 21, 2007

(51) Int. Cl.
*B01D 45/00* (2006.01)

(52) U.S. Cl. .......................................... 55/440; 55/443

(58) Field of Classification Search ........... 55/440–445, 55/464–465, 434, DIG. 5, DIG. 37
See application file for complete search history.

(56) References Cited

U.S. PATENT DOCUMENTS

| | | | | |
|---|---|---|---|---|
| 2,479,625 A | | 8/1949 | Kimmell ...................... 183/79 |
| 3,096,705 A | | 7/1963 | Goettl .......................... 98/121 |
| 3,227,599 A | * | 1/1966 | Holland ...................... 428/118 |
| 3,227,600 A | * | 1/1966 | Holland ...................... 428/116 |
| 3,338,035 A | * | 8/1967 | Dinkelacker ................. 55/440 |
| 3,504,484 A | * | 4/1970 | Buffet ......................... 96/356 |
| 3,517,486 A | | 6/1970 | Golden ........................ 55/440 |
| 3,805,496 A | * | 4/1974 | Sokolowski ................. 55/440 |
| 3,813,855 A | | 6/1974 | Hill et al. ..................... 55/440 |
| 3,831,350 A | | 8/1974 | Gilles et al. .................. 55/128 |
| 3,849,095 A | * | 11/1974 | Regehr ........................ 55/394 |
| 3,899,427 A | * | 8/1975 | Connelly et al. ............ 210/521 |
| 3,912,471 A | | 10/1975 | Cotton, Jr. .................... 55/440 |
| 3,953,183 A | * | 4/1976 | Regehr ........................ 55/440 |
| 4,002,444 A | | 1/1977 | Artemov et al. .............. 55/413 |
| 4,053,292 A | * | 10/1977 | Schneider et al. ............ 96/245 |
| 4,141,706 A | * | 2/1979 | Regehr ........................ 55/437 |
| 4,175,938 A | * | 11/1979 | Regehr et al. ................ 55/440 |
| 4,198,215 A | | 4/1980 | Regehr ........................ 55/185 |
| 4,322,234 A | * | 3/1982 | Mock .......................... 55/440 |
| 4,361,426 A | * | 11/1982 | Carter et al. ................. 96/299 |
| 4,802,901 A | * | 2/1989 | Wurz et al. ................... 55/440 |
| 5,031,693 A | * | 7/1991 | VanDyke .................... 165/166 |
| 5,104,431 A | | 4/1992 | Fewel, Jr. .................... 55/440 |
| 5,268,011 A | | 12/1993 | Wurz ......................... 55/257.2 |
| 5,296,009 A | * | 3/1994 | Duke .......................... 55/440 |
| 5,514,193 A | | 5/1996 | Schaal et al. ............... 55/257.2 |
| 6,315,804 B1 | | 11/2001 | Bradley ....................... 55/440 |
| 6,810,835 B2 | * | 11/2004 | Ishiguro et al. .............. 55/444 |
| 6,852,146 B2 | | 2/2005 | Holmes et al. ............... 95/216 |
| 6,923,250 B2 | | 8/2005 | Hegg et al. ................. 165/113 |
| 2005/0120688 A1 | | 6/2005 | Shepherd .................... 55/440 |

* cited by examiner

*Primary Examiner*—Duane Smith
*Assistant Examiner*—Dung Bui
(74) *Attorney, Agent, or Firm*—David J Piasecki

(57) ABSTRACT

The invention provides a vane-type mist eliminator device having formed or corrugated sheets, flat sheets, and integral louvers. The corrugated sheets and flat sheets are layered such that the arrangement of sheets and integral louvers creates at least one tortuous fluid flow channel from an inlet to a vapor outlet of the device An outer casing or frame is sufficient to hold the sheets together.

22 Claims, 9 Drawing Sheets

VANE-TYPE DEMISTER

FIELD OF THE INVENTION

This invention relates to devices for separating a liquid and a vapor.

BACKGROUND OF THE INVENTION

Many industrial processes use vapor-liquid separation devices to remove liquid droplets from a vapor stream. For the purposes of this application, the terms "vapor" and "gas" are used interchangeably. In mass and/or heat transfer equipment, liquid droplets are often generated through vapor-liquid contacting or phase change. An example of one such process is co-current fractionation wherein a generally downward flowing liquid phase contacts an upward flowing vapor phase. Although the overall flow of vapor and liquid in this process is counter-current, the flow of vapor and liquid is co-current when the vapor and liquid are contacted as the liquid is entrained in the vapor and carried upward to a vapor-liquid separation device wherein the liquid is de-entrained from the vapor. The liquid then flows downward to an inferior stage and the vapor flows upward to a superior stage. Air conditioning systems also commonly require vapor-liquid separation systems to remove water from the cooled air.

One method for de-entraining liquid from vapor is a device which causes the stream to change direction. Because the liquid droplets have a higher density than the vapor of the stream, the momentum of the liquid will tend to make the liquid travel in a straight line and not change direction as quickly as the vapor. The use of various vapor-liquid separation devices at or near the vapor outlet of a variety of process vessels such as flash drums, vapor-liquid separators, receivers, storage tanks, scrubbers, absorbers, and distillation columns is well known in the art.

One such de-entrainment device includes a series of vanes arranged in parallel, each vane being a thin sheet that is formed into hills and valleys. Conventionally, the vanes are spaced apart by spacers to provide a narrow flow path for the stream. The vanes and spacers are often welded or bolted into position, which has a high manufacturing cost in terms of time, skill, and materials. The vapor stream enters one side and takes a zig-zag path to reach the other side. The entrained droplets cannot negotiate the rapid zig-zag and impinge on the vane, where they cling and run down the wall. De-entrainment devices may also include louvers welded to the vanes. The louvers provide pockets that trap and drain liquid and greatly reduce liquid re-entrainment and improve the vapor-liquid separation. The welding, bolting, or otherwise attaching of the louvers, however, increases the complexity of manufacturing.

The vanes and louvers need to be geometrically designed to permit the stream to flow through at a high velocity with a maximum removal of liquid particles from the stream and a minimum pressure drop. As industrial technology has advanced, there has evolved an increasing demand for eliminators which operate at high velocities, with a high efficiency level, and a minimum pressure drop.

A variety of such vapor-liquid separation devices are taught for example by U.S. Pat. Nos. 4,802,901; 5,296,009; 3,912,471; and 6,852,146. Therefore, what is needed is a vapor-liquid separating device having a simplified structure and assembly. Eliminating the need for additional components and/or steps such as spacers fastening or welding to at least partially define the fluid flow paths is also desirable.

SUMMARY OF THE INVENTION

The invention comprises, in one form thereof, a vane-type mist eliminator having formed or corrugated sheets, flat sheets, and integral louvers. The corrugated sheets and the flat sheets are layered such that the arrangement of sheets and integral louvers creates at least one tortuous fluid flow channel from an inlet to a vapor outlet of the device. An outer casing or frame is sufficient to hold the plates together.

Some variations include the order of layering the corrugated sheets and flat sheets and whether the louvers are formed in the corrugated sheets, the flat sheets, or both. Further variations include the shape and size of the louvers as well as the shape and the size of the corrugated sheets and the configuration of the outer frame.

In one embodiment, the invention includes a vapor-liquid separation structure, comprising a plurality of corrugated sheets, a flat sheet layered between each pair of the corrugated sheets; and an outer frame that holds the layered corrugated sheets and flat sheets together. Each of the corrugated sheets comprises at least one integral louver.

In a further embodiment, the invention includes a vapor-liquid separation structure, comprising a plurality of flat sheets, a corrugated sheet layered between each pair of the flat sheets, and an outer frame that holds the layered flat sheets and corrugated sheets together. Each of the flat sheets comprises at least one integral louver.

In another form, the invention includes a production method of a vane-type mist eliminator. The method comprises the steps of providing a plurality of corrugated sheets and a plurality of substantially flat sheets, the corrugated and flat sheets having a leading edge and a trailing edge, forming integral louvers in the corrugated sheets and/or the flat sheets, and layering the corrugated sheets and the flat sheets such that the arrangement of sheets and integral louvers creates at least one tortuous fluid flow path from an inlet proximate the leading edge of the sheets to a vapor outlet proximate the trailing edge of the sheets; and securing the layered corrugated sheets and flat sheets together in a frame.

An advantage of the present invention is that the use of flat sheets and corrugated sheets with louvers are simply layered to form a self supporting separating structure. That is, the layered sheets and fluid flow channels they define are able to maintain the desired spacing without requiring other elements such as spacers, fasteners, and welding. Further, variations of the geometric design of the vanes and louvers of the present invention may be provided to achieve high vapor-liquid separation while avoiding unacceptable pressure drops in dynamically disparate systems.

BRIEF DESCRIPTION OF THE DRAWINGS

Corresponding reference characters indicate corresponding parts throughout the several views. The drawings illustrate several embodiments of the invention but should not be construed as limiting the scope of the invention in any manner.

DETAILED DESCRIPTION

Figure 1A:
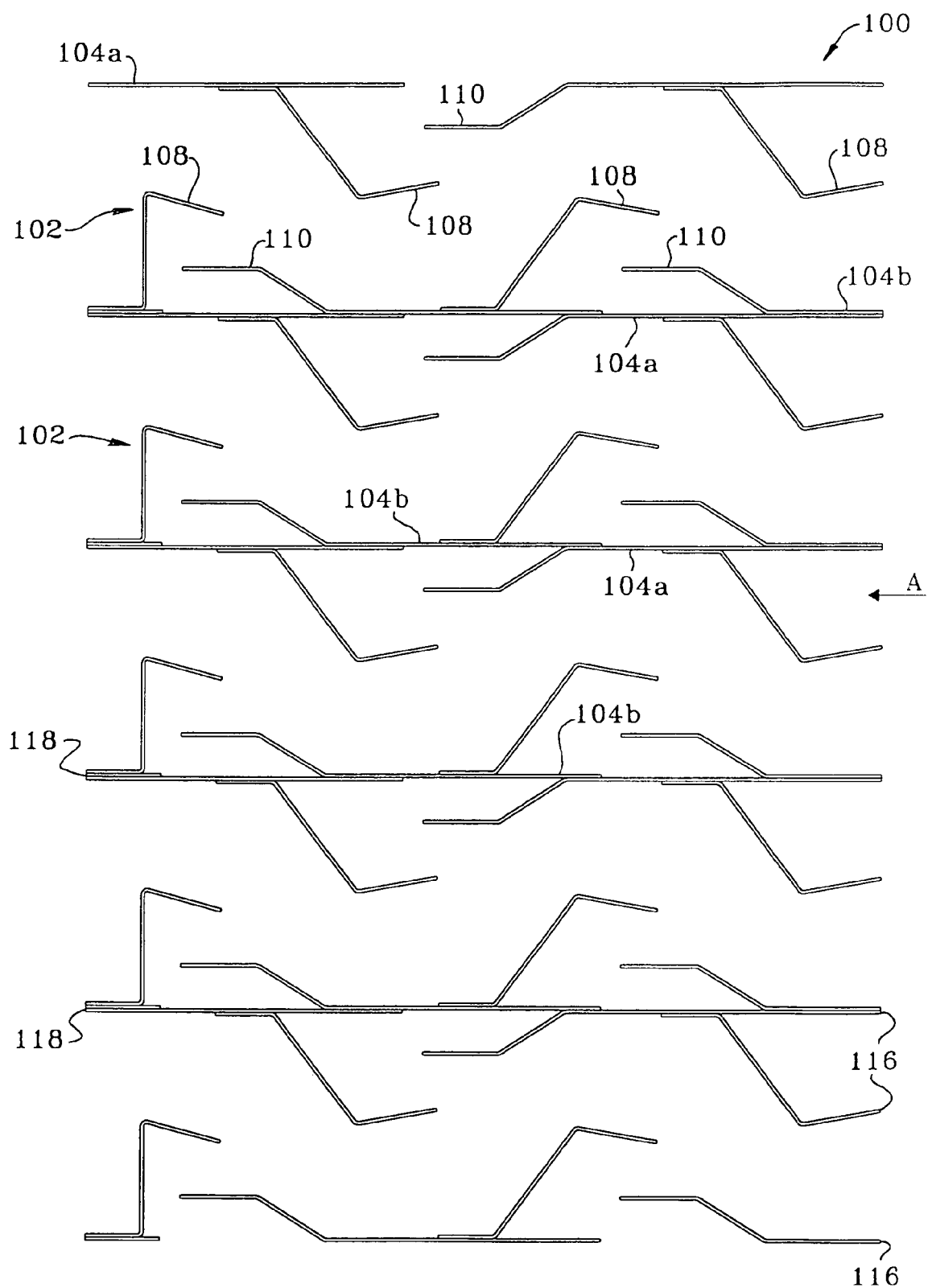
FIG. 1A is a top view of a central section of a vane-type mist eliminator of the present invention.

Referring to FIG. 1A, there is shown a top view of a central section illustrating the arrangement of vanes or sheets and integral louvers defining the fluid flow channels according to one embodiment of the present invention. The mist eliminator or demister 100 includes a plurality of corrugated sheets 102, a plurality of flat sheets 104a and 104b, and an outer frame shown in FIG. 1B. Each of the corrugated sheets 102 comprises a plurality of integral louvers 108 and the flat sheets 104a, 104b comprise integral louvers 110. The sheets or vanes have a leading edge 116 proximate the inlet of the vapor-liquid separator or demister and a trailing edge 118 proximate the vapor outlet.

Figure 1B:
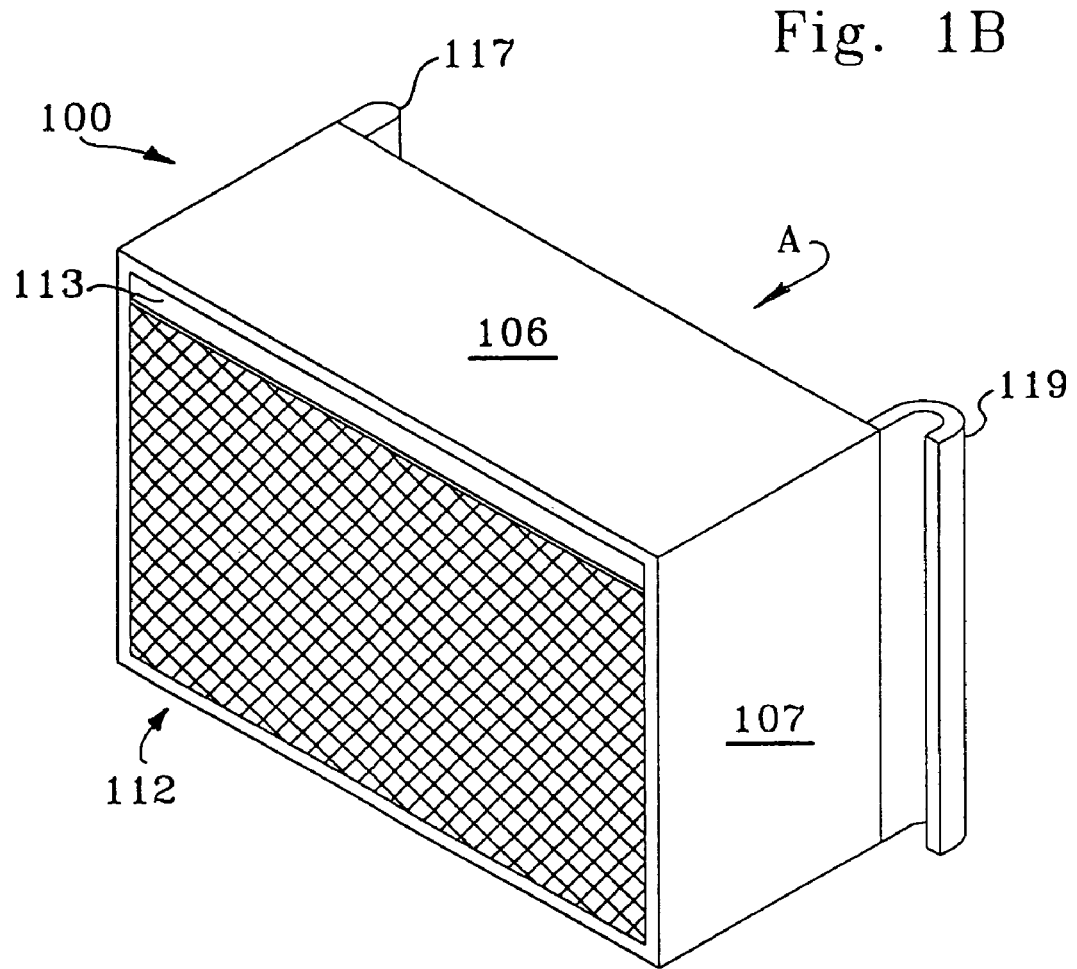
FIG. 1B is an isometric view of an outer frame of the mist eliminator of the present invention.

FIG. 1B shows one embodiment of an outer frame having a solid top plate 106 and two solid sidewalls 107 that are welded together or otherwise securely assembled to contain the corrugated sheets 102 and the flat sheets 104a, 104b. The outer frame in this embodiment includes perforated plates where vapor and liquid enter and exit the demister 100. The vapor-liquid stream enters the demister in the direction of arrow A from the back through an inlet, is separated, and exits through a vapor outlet 112 and a liquid outlet which is the bottom of the demister. The amount of vapor that exits via the liquid outlet and liquid that exits via the vapor outlet will vary with the efficiency of the specific design. Perforated plates are one example of flow manipulators that may be used. Other non-limiting examples of flow manipulators include expanded metal, porous solids, mesh pads, screens, grids, mesh, profile wire screens, and honeycombs. It has been found that the fractional open area of the flow manipulators affect both separation efficiency and pressure drop of the demister 100. The fractional open area of the flow manipulators may vary on different sides and on the same side to optimize the separation efficiency and pressure drop of the demister 100. Various types of flow manipulators may be used in a single demister. The vapor outlet 112 of the demister 100 may include an optional imperforate top portion 113 that extends from the top plate 106 towards the bottom of the demister. The imperforate top portion 113 may be a separate plate or it may be an extension of the top plate and/or the sidewalls that are folded over the vapor outlet. The top portion 113 may be coplanar with the vapor outlet or the associated flow manipulator if present, or it may overlay them. In one embodiment, the top portion 113 extends to about 10% of the height of the demister. In another embodiment the top portion 113 extends to about 30% of the height of the demister. In a further embodiment the top portion 113 extends to about 50% of the height of the demister. This imperforate top portion 113 of the vapor outlet 112 has been found to improve the vapor-liquid separation efficiency. In other embodiments, flow manipulators are not used on some or any of the inlets and outlets of the demister 100 and the fluid channels defined by the sheets or vanes are left open.

Although the outer frame may include three solid plates as illustrated, the frame may simply be angled or flat stock that secures the edges of the sheets 102, 104a, and 104b. In other embodiments straps or bands define the frame that binds the sheets together. A frame may comprise a variety of these and/or other commonly known elements to clamp the sheets together. The frame may be secured by any well known means. Non-limiting examples include welding, bolting, gluing, tying, crimping, hinges, and pressure fittings. Embodiments with no solid frame plates may be used for example inside a process vessel to prevent liquid from leaving the vessel via a connected vapor outlet conduit. The outer frame may also comprise the walls of the vessel or conduit in which the demister is located. The demister may be oriented for any direction of vapor flow. In some embodiments the primary vapor flow is horizontal. In other embodiments the primary vapor flow is vertical. The demister may also be positioned at an angle so that the vapor flow has both horizontal and vertical velocity components. The primary vapor flow may have either an upward or downward velocity component.

Figure 1C:
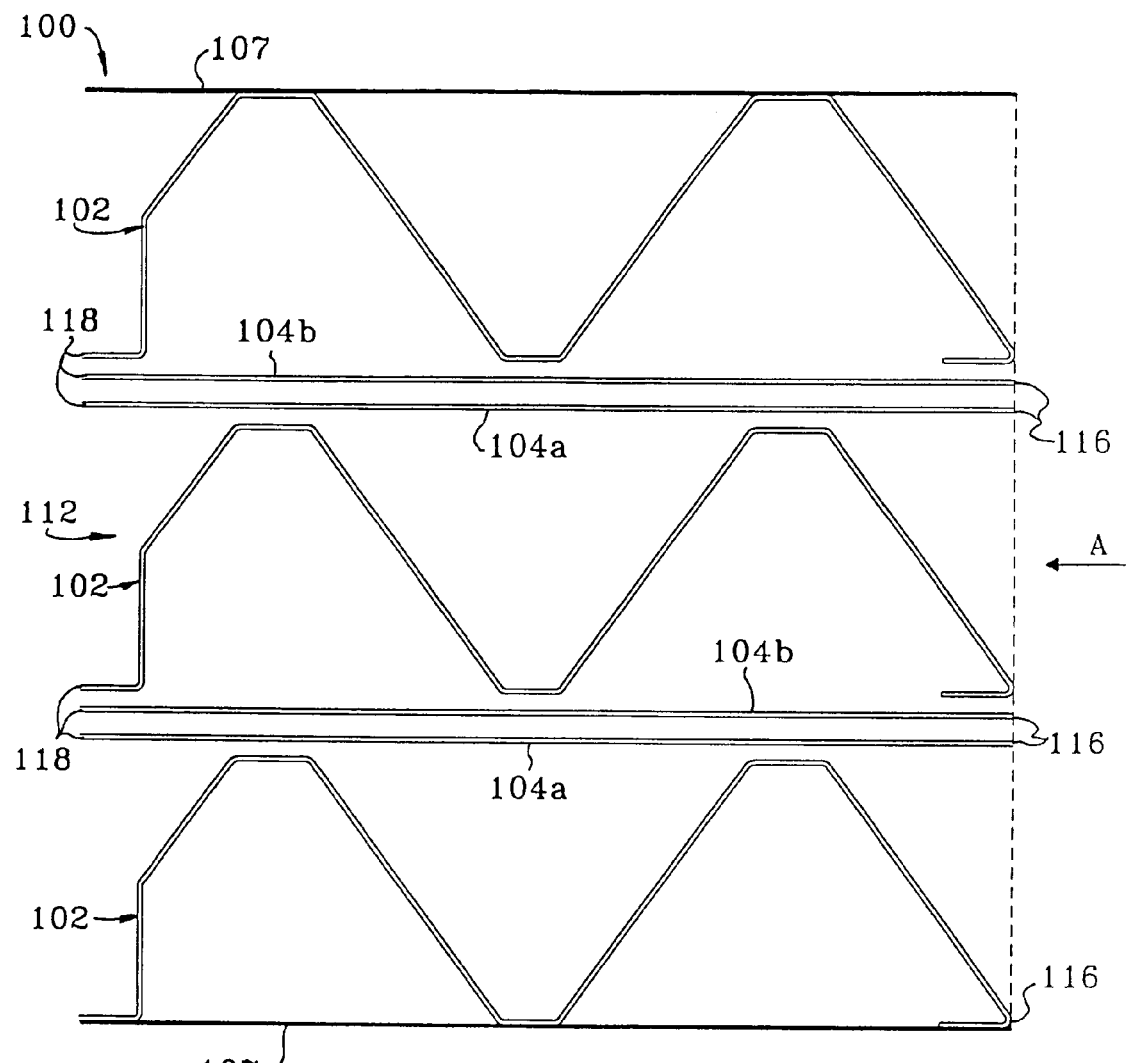
FIG. 1C is a top view of the unassembled components of the vane-type mist eliminator of FIG. 1A prior to the integral louvers being formed.

FIG. 1C shows how three corrugated sheets 102 and the flat sheets 104a, 104b may be layered within an outer frame to create a demister with three fluid flow channels. The sheets are shown without the formed louvers and with a gap between the sheets to illustrate the overall structure. However, in the assembling process, the sheets are layered with the formed louvers and sandwiched tightly together between sidewalls 107 such that the corrugations of a corrugated sheet 102 separate a flat sheet 104a from a flat sheet 104b with no need for welding the sheets in place or using spacers to separate the sheets. In other words, a flat sheet 104a and a flat sheet 104b are both layered between each pair of corrugated sheets 102. Thus, the stack of layered sheets defines fluid flow channels in a self supporting manner and the outer frame provides a means to hold the sheets together. FIG. 1C shows a flow manipulator at the inlet proximate the leading edge 116 of the sheets and an open vapor outlet 112. That is, there is no flow manipulator at the trailing edge 118 of the sheets. When the device is assembled with the louvers, the primary vapor flow will be from right to left with the disengaged liquid draining to the bottom in a direction normal to the plane of the page. If louvers are desired in the outermost flow channels they may be attached by any convention means to the inner surface of the sidewalls 107, or a standard flat sheet 104a or 104b with louvers may be layered between the outermost corrugates sheets 102 and the sidewalls 107 as appropriate.

Figure 1D:
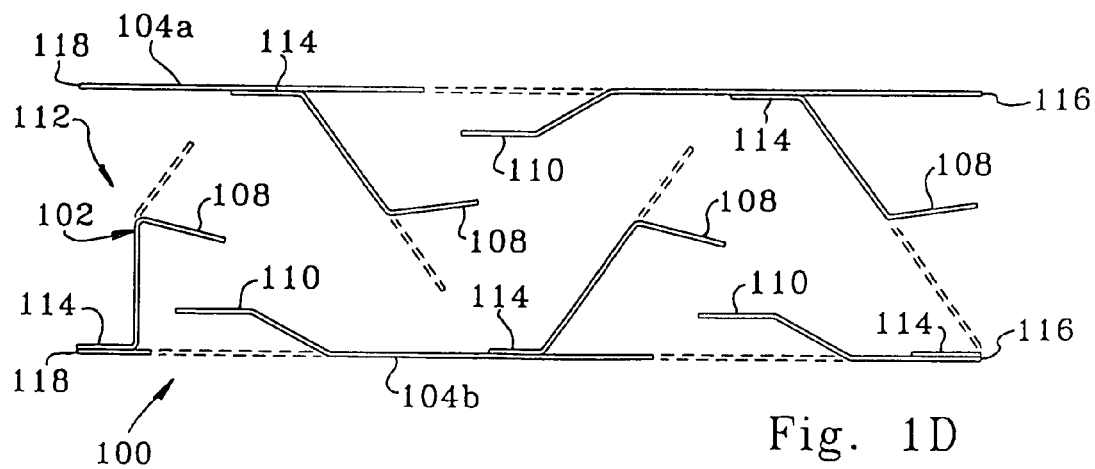
FIG. 1D is a cross-sectional view of the vane-type mist eliminator showing the pre-formed louvers in phantom.
Figure 2A:
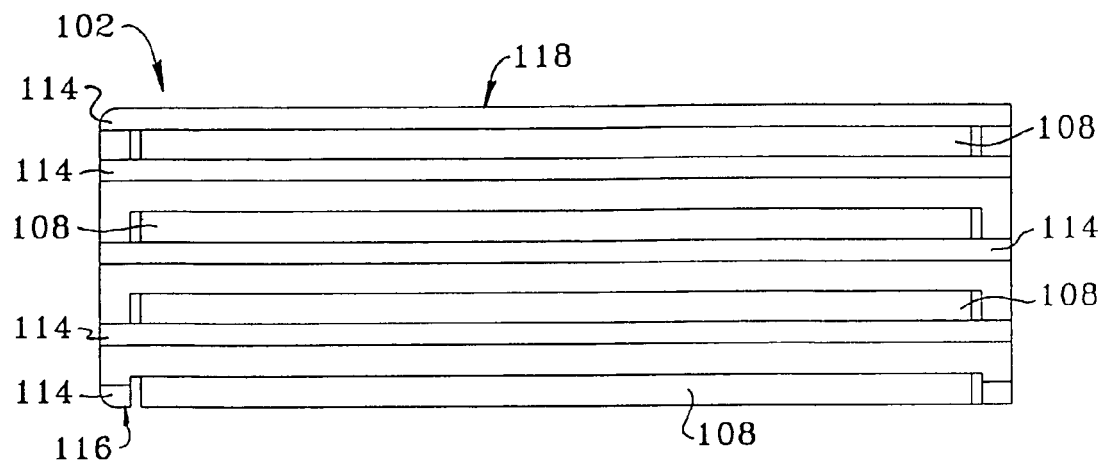
FIG. 2A is a plan view of the corrugated sheet with integral louvers.
Figure 2B:
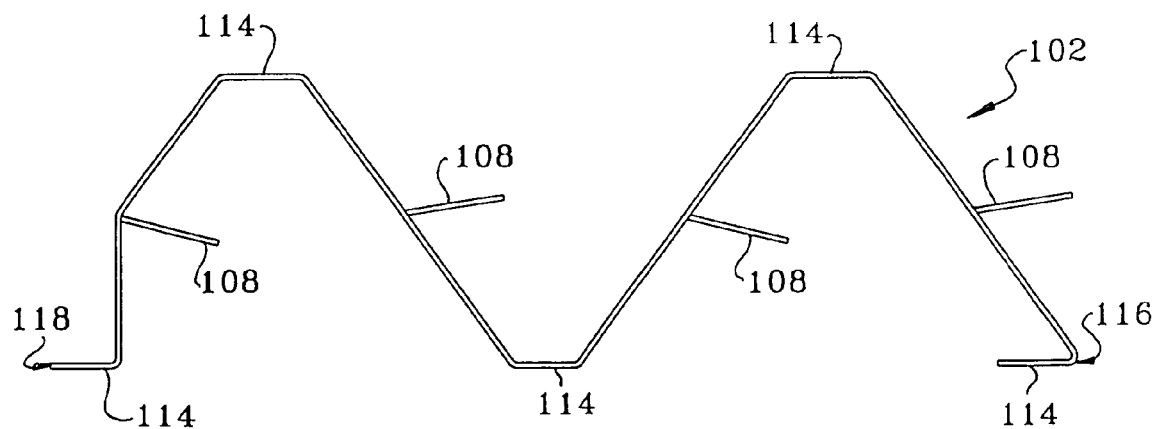
FIG. 2B is an end view of the corrugated sheet of FIG. 2A.

FIG. 1D is a thin slice cross-section of the corrugated sheet 102 sandwiched between a flat sheet 104a and a flat sheet 104b; illustrating the formation of the louvers 108 and 110 by showing the preformed louvers in phantom. In fabrication, however, the louvers are formed prior to layering the sheets. The corrugated sheet 102, also shown in FIGS. 2A and 2B, includes several corrugation peaks 114, a leading edge 116, and a trailing edge 118. As shown in FIGS. 1D and 2B the corrugation pattern of sheet 102 need not be uniform. The pattern may be varied at any point, especially near the leading and trailing edges where changes may improve the overall stability of the device. In this embodiment, a wide U shaped portion is removed from each slanted corrugation wall that connects two corrugation peaks 114 for a significant length of the sheet leaving the ends intact for structural support and to contact the flat sheets 104a, 104b. Thus, this removed portion defines the edges of louvers 108 that are integrally formed by bending a portion of the corrugated sheet 102 away from the proximate corrugation peak 114 to form a pocket between the louver 108 and the flat sheet 104a or 104b. The spaces left by the louvers 108 and the removed portions allow fluid to pass from the inlet to the vapor outlet 112. The fluid passages or channels are offset or tortuous so the fluid may not pass in a straight line from the inlet to the vapor outlet 112. In application, the liquid captured by one pocket should be drained at the bottom of that pocket and the captured liquid should not leak through gaps between the corrugated sheets 102 and flat sheets 104a and 104b. The small flat segments at the peaks 114 of the corrugated sheets 102 facilitate corrugated sheets 102 forming a sufficient seal with the flat sheets 104a and 104b at the contact points when the sheets are sandwiched together in the outer frame. However, it is noted that flat segments at the corrugation peaks 114 are not required by the invention. Any geometry that provides a seal to prevent captured liquid from leaking through gaps between the corrugated sheets and flat sheets when the device is assembled is sufficient.

Figure 3A:
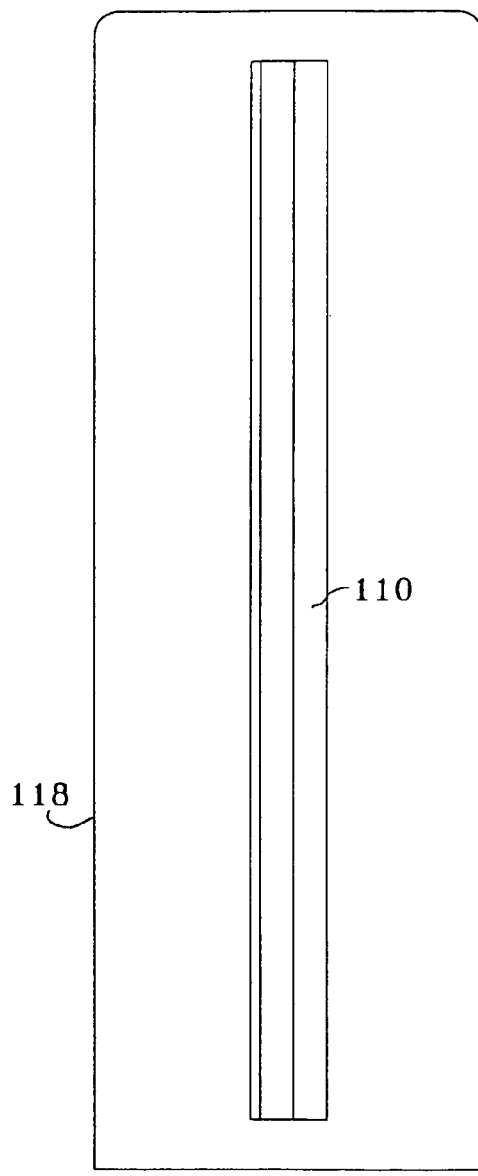
FIG. 3A is a plan view of a flat sheet with one integral louver.
Figure 4A:
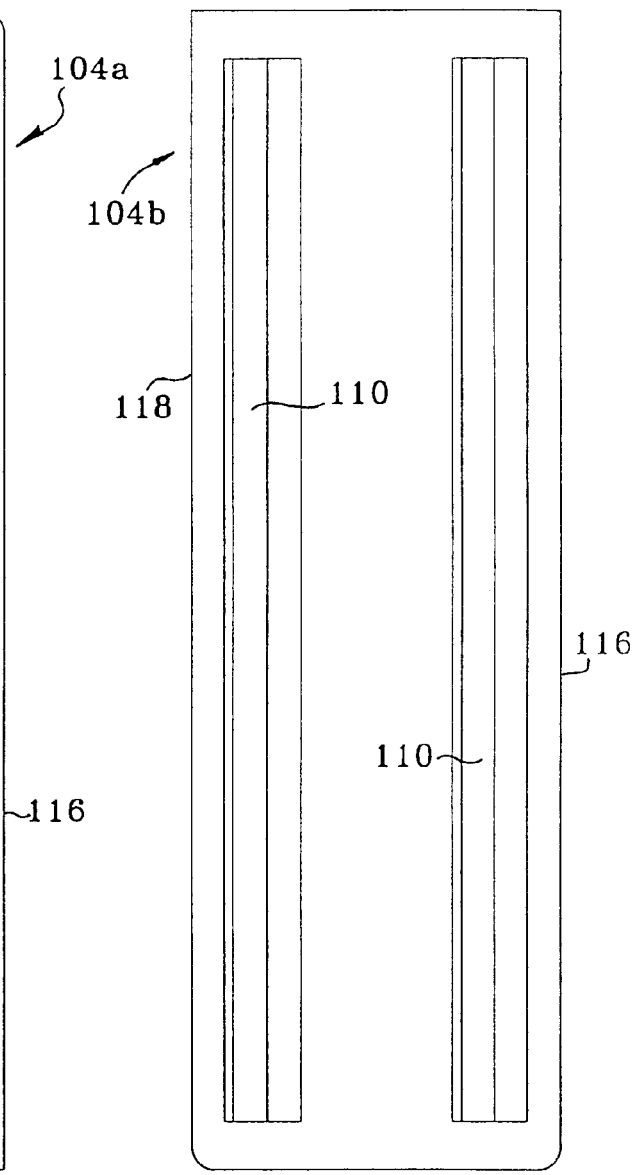
FIG. 4A is a plan view of a flat sheet with two integral louvers.
Figure 3B:
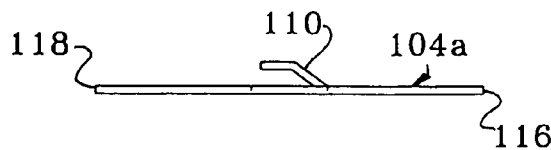
FIG. 3B is an end view of the flat sheet of FIG. 3A.
Figure 4B:
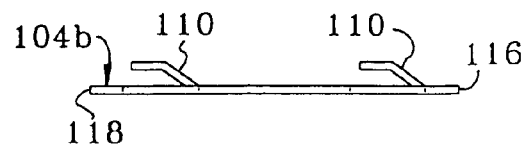
FIG. 4B is an end view of the flat sheet of FIG. 4A.

FIG. 1D shows that in this embodiment louvers 110 are directed away from leading edge 116 and toward the pocket formed by the proximate louver 108. In other embodiments, some or all of the louvers 110 are oriented towards the leading edge 116. The flat sheet 104a, also shown in FIGS. 3A and 3B, includes one louver 110 while the flat sheet 104b, also shown in FIGS. 4A and 4B, includes two louvers 110. The louvers 110 are integrally formed from the flat sheets 104a, 104b such as by cutting or punching through the sheet to define three edges of the louver and bending the louver 110 twice to form a slanted portion and a flat portion. In a particular embodiment, the flat portion of louver 110 is substantially parallel with the rest of the flat sheets 104a, 104b.

In a particular embodiment, the louvers 108 and 110 are punched into shape in a single motion rather than being formed in multiple steps as described above. Further, the louvers 108 may be formed at the same time as or before or after the corrugations are formed in the corrugated sheets 102. Alternatively, the corrugated sheets 102 and the flat sheets 104a, 104b are molded, such as by injection molding, and the louvers are integrally formed in the sheets during the molding process, particularly if the fabrication material is plastic.

According to the present embodiment, the demister 100 is a standard size having a manageable weight and the outer frame may include interlocking means that cooperate with other demisters 100 to form a larger row of demisters 100. For example as shown in FIG. 1B the hidden sidewall includes optional male tab 117 which will interlock with the optional female tab 119 located on the opposite sidewall of the next demister. In the illustrated embodiment, these tabs extend the full height of the demister along the leading edge of the sidewalls to effectively prevent fluid flow between interlocked demister units. In other embodiments the tabs are located along the trailing edges of the sidewalls. Such tabs may also be located at the other edges of the demister units. Multiple male and/or female tabs may be used such as along both the leading and trailing edges of the demister units. This modular configuration allows a fabricator to produce demisters 100 in one manageable size to be assembled in rows of varying length. Some custom-sized demisters 100 may be required for particularly short rows or to match the length required. In a similar manner not illustrated, interlocking mechanisms may be incorporated into the outermost flat sheet 104a of one demister so that it can be connected to outermost flat sheet 104b of the next demister of the row thus eliminating the need for sidewalls between every demister. Any known interlocking mechanisms may be used to improve the structural integrity of an assembled row, stack, or two or three dimensional array of demisters.

In use, the louvers 108, 110 are formed in several corrugated sheets 102 and flat sheets 104a, 104b, respectively, and the sheets are layered as described above to form the assembly shown in FIG. 1A. The layered sheets may be placed in the outer frame so that the leading edges 116 and trailing edges 118 of the sheets are each proximate to a flow manipulator at the fluid inlet and vapor outlet 112, respectively. The outer frame holds the layered sheets together and the sheets require no welding and no spacers for assembly. In the present embodiment, there is one flat sheet 104a and one flat sheet 104b for every corrugated sheet 102. The specific details for a demister according to the embodiment illustrated in FIG. 1A or other embodiments of the invention such as the total number of sheets, the width of the sheets 102, 104a, and 104b from leading edge to the opposite trailing edge, the height of the sheets from the top plate 106 to the liquid outlet, the dimensions and configuration of corrugated sheets 102, such as the number of corrugations and type(s), for example, sinusoidal, triangular, rectangular, and others, and the number and dimensions of louvers 108 and 110 will vary based on the specific vapor-liquid separation objectives. Factors such as the volume of fluid to be separated, the physical properties of the vapor and liquid, the liquid droplet size and distribution, the separation efficiency desired, and the relative liquid to vapor load may impact the specific demister design parameters.

In an embodiment, a vapor-liquid mixture passes through a flow manipulator to the inlet and is deflected by the integral louvers 108 and 110 while passing through the fluid channels or passages created by the sheets and formed louvers. The fluid passages are offset to thereby require the fluid to change direction several times. These direction changes and the rapid direction changes the vapor-liquid mixture encounters in the pockets formed by the louvers 108 and 110 tend to cause the liquid to separate from the vapor. The liquid tends to be trapped by and runs down the pockets formed by louvers 108 and 110 to exit the demister 100 through a flow manipulator located at the bottom of the outer frame. The vapor continues through the fluid passages and the pockets to exit the demister 100 through the flow manipulator proximate the vapor outlet 112. It is noted that the invention does not require the vapor and liquid outlets to be defined by separate sides of the demister, nor is an outlet limited to a single side. For example, one side may have an upper portion that defines the vapor outlet and a lower portion that defines the liquid outlet. In other embodiments, a first portion of the separated liquid exits the demister from a lower portion of one side and second portion of the separated liquid exits from the demister bottom.

The invention encompasses practically endless variations of the louvers such as by number, position, orientation, size, and shape. The louvers 110 and 108 may be oriented towards the leading edge 116 and/or the trailing edge 118 of the sheets. That is, various bends in the louvers may direct specific portions of the louver towards the inlet or vapor outlet.

Figure 5A:
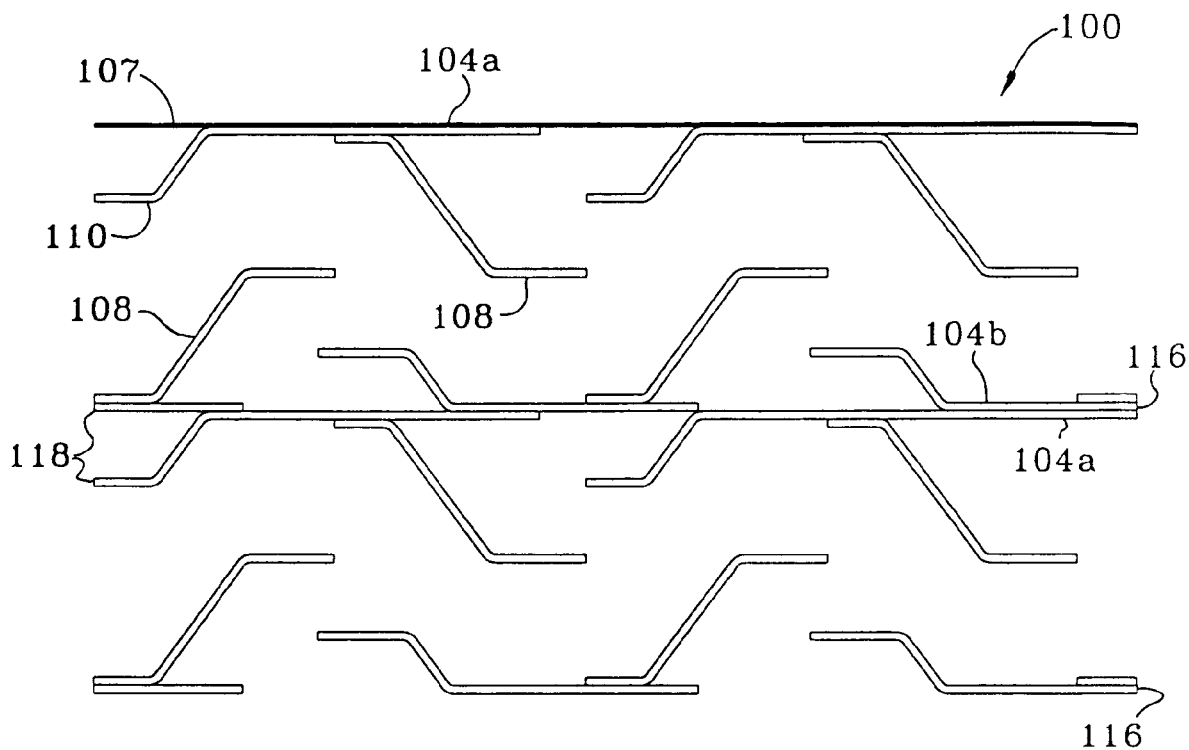
FIGS. 5A and 5B are top views of a central section of a vane-type mist eliminator of the present invention.
Figure 5B:
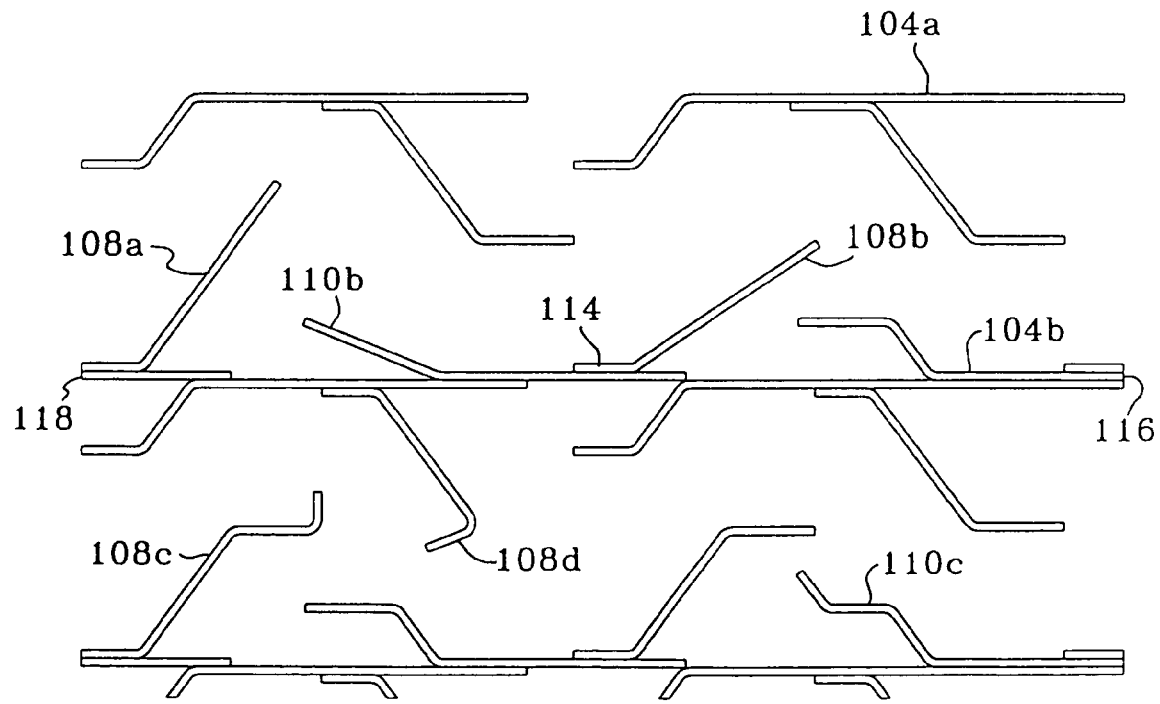

The exact design of the louvers will be influenced by the balance between permissible pressure drop and separation efficiency and other parameters of the specific vapor-liquid separation desired. As shown in FIG. 5A, the flat sheet 104a includes a second louver 110 proximate to the trailing edge 118 and the louvers 108 are formed to have a portion that is substantially parallel with the flat sheets 104a, 104b. In another variation shown in FIG. 5B, the louver 108a may be defined by the remaining portion of the slanted corrugated wall remaining after a portion of the wall is removed to allow passage of the fluid. That is, no bending of the corrugated wall is required. Another louver 108b is formed by bending the remaining portion of the slanted wall to change the angle it joins the peak 114. Similarly, as shown by louver 110b, the flat sheet louvers do not require a bend other than to deflect them from the plane of the flat sheets. The louvers such as 108c and 110c may have multiple bends including portions that are perpendicular to the sidewalls. A louver 108d or a portion of it may be directed to the trailing edge 118. It is not necessary to remove a portion of the corrugated or flat sheets to form the louvers. Cutting or punching through the sheet and bending or otherwise forming the louver such as by molding is sufficient. In another embodiment a portion of the flat sheet is removed in the formation of a louver 110 as was previously described for a corrugated sheet louver 108. In some embodiments of the invention there will be one design for all louvers 108 and a different design for all louvers 110, and all of the fluid flow channels will have the same resulting fluid flow path. However, neither of these is required in the subject invention. For example, the fluid flow paths may be different in any or all of the fluid flow channels, especially the outmost or terminal fluid flow channels. Different corrugated sheets such as by height that is the distance between flat plates and/or the number of corrugations in the fluid flow channel may be used in any or all of the fluid flow channels of a demister. The louvers may vary within a single flow channel and/or between flow channels such as by the number, location, size, orientation, and geometry. In some embodiments the corrugated sheets and/or the flat sheets are substantially parallel such that width of the fluid flow channel is substantially constant. In other embodiments the sheets are skewed so that the fluid flow channel is tapered. The fluid flow channel may be tapered towards the inlet or the vapor outlet, and/or towards the liquid outlet or the opposite side. For example, the height of a corrugated sheet may be tapered in the desired direction. Thus, myriad variations in the louvers and flow channels are encompassed by the subject invention wherein the layered sheets form self supported fluid flow channels.

Figure 6A:
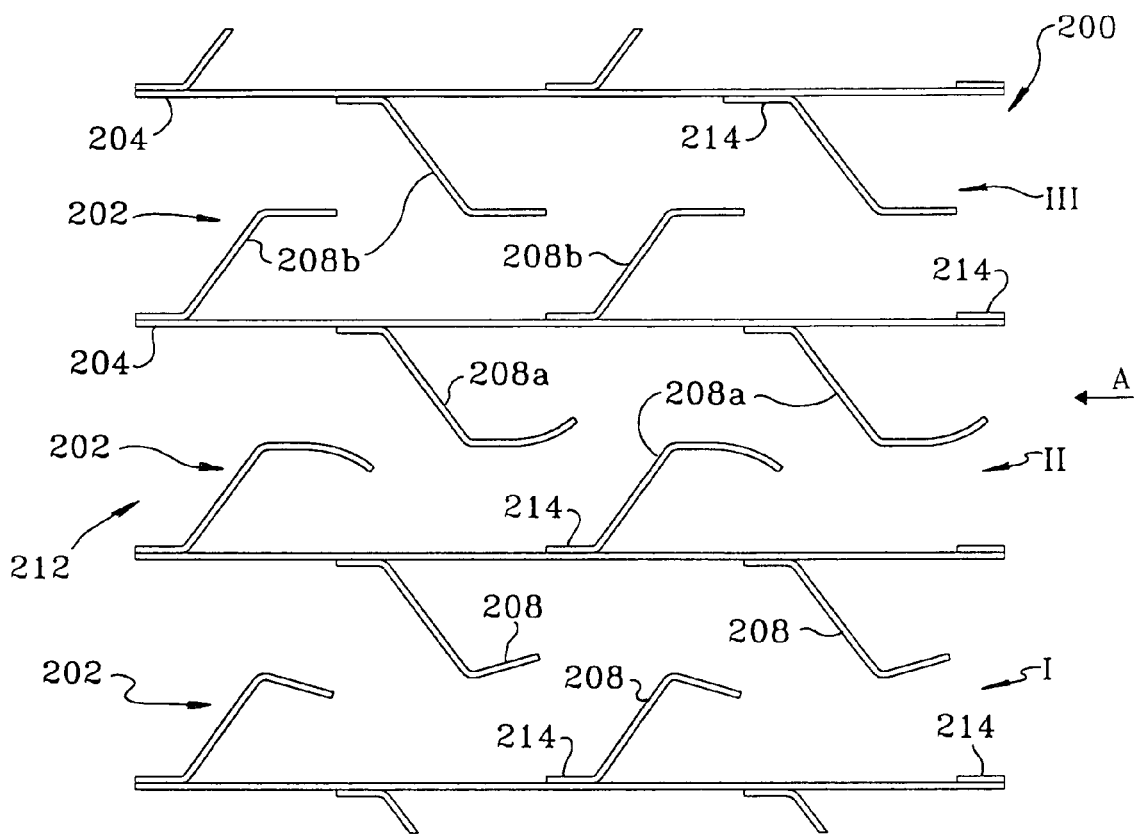
FIG. 6A is a top view of a central section of a vane-type mist eliminator according to a second embodiment of the present invention.
Figure 6B:
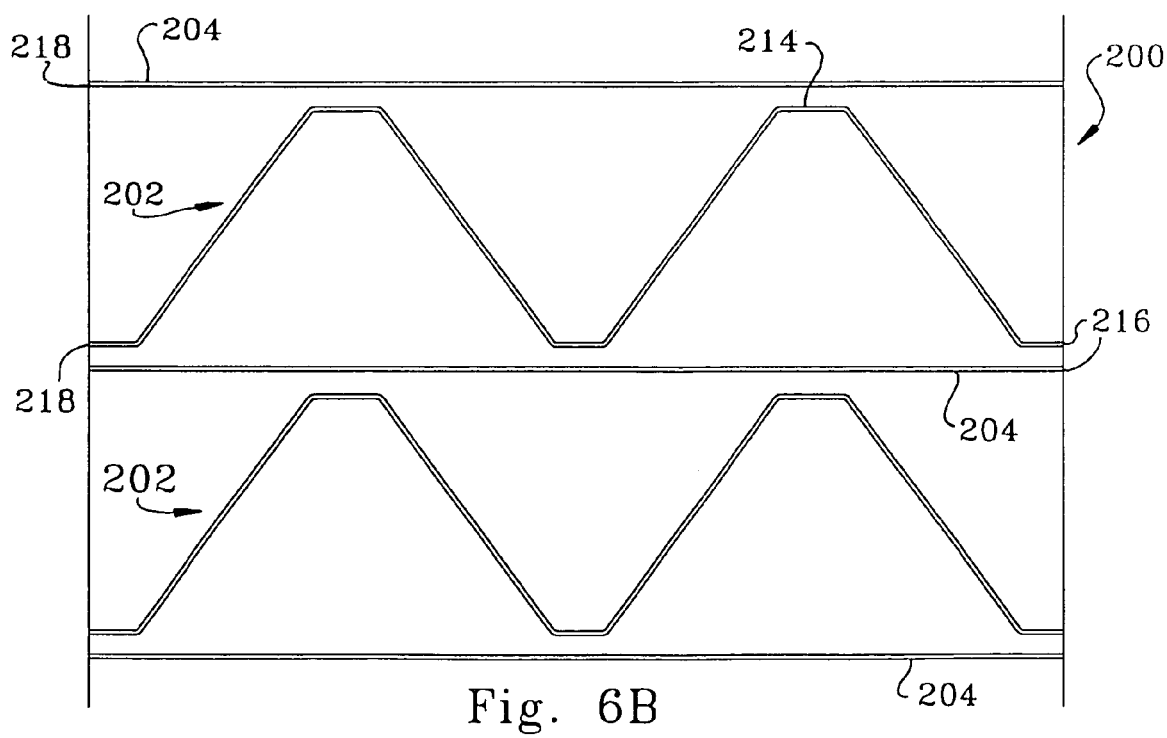
FIG. 6B is a top view of the unassembled components of the vane-type mist eliminator of FIG. 6A prior to the integral louvers being formed.

In a second embodiment shown in FIGS. 6A and 6B, the demister 200 includes a plurality of corrugated sheets 202 and a single flat sheet 204 layered between each pair of corrugated sheets 202. The demister 200 is similar to the demister 100 described in the first embodiment; the corrugated sheets 202 having integrally formed louvers and providing self supported fluid channels between the inlet and the vapor outlet 212. Also similar to the first embodiment, the demister 200 requires a vapor-liquid mixture passing therethrough to change direction several times, causing the liquid to separate from the vapor. The flat sheets 204, however, do not include louvers, thereby providing a demister having a simpler separation structure. FIG. 6B illustrates the layering for two fluid channels and flow manipulators at the inlet and vapor outlet. Three fluid channels are illustrated in FIG. 6A with various louver designs. Channel I contains slanted louvers 208, similar to the louvers 108 in the first embodiment, that also serve to reduce the pressure drop through the fluid channel. Channel II illustrates a variation wherein louvers 208a are rounded or curved to reduce the pressure drop through the fluid channel. Louvers 208b in channel III have one bend and a planar portion that is parallel to the flat sheets 204.

Figure 7A:
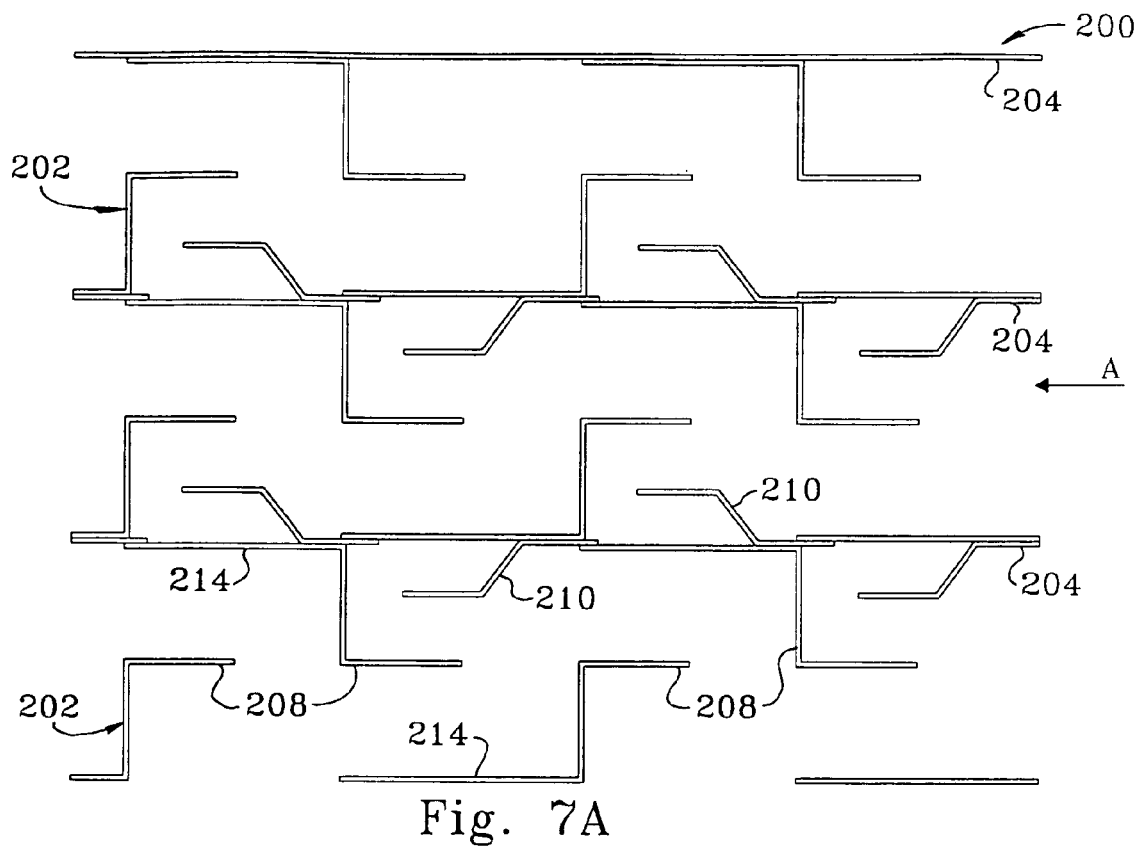
FIG. 7A is a top view of a central section of a vane-type mist eliminator according to a second embodiment of the present invention.
Figure 7B:
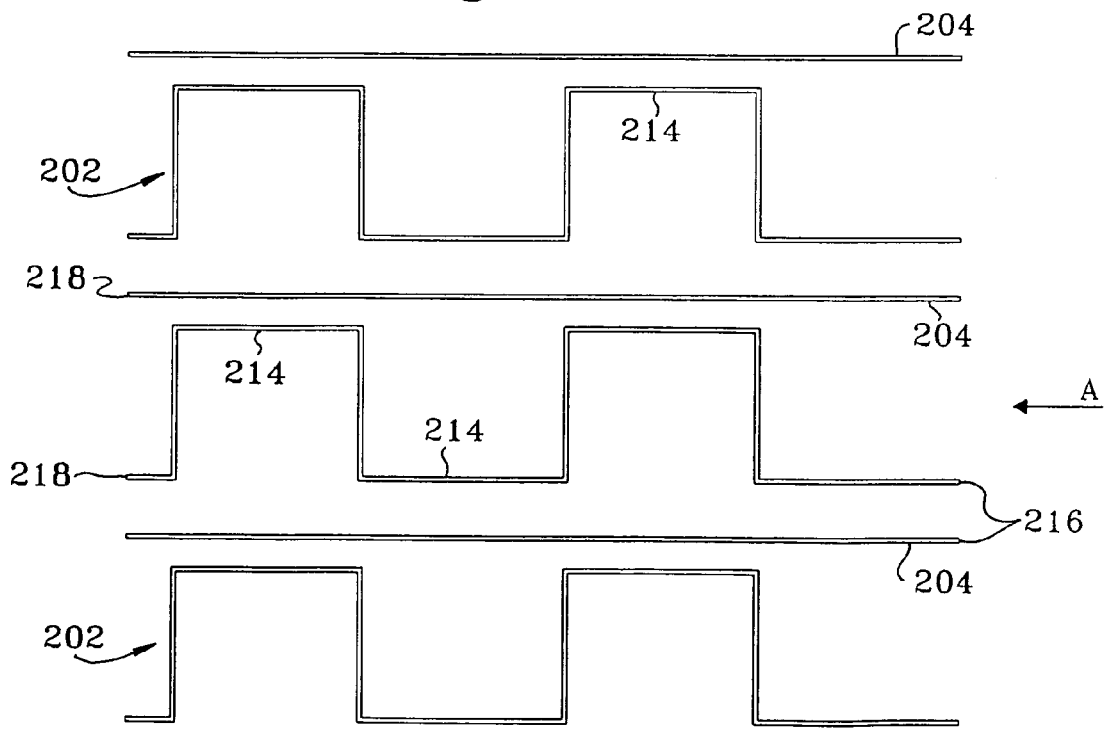
FIG. 7B is a top view of the unassembled components of the vane-type mist eliminator of FIG. 7A prior to the integral louvers being formed.

Another embodiment having a single flat sheet 204 layered between each pair of corrugated sheets 202 is illustrated in FIGS. 7A and 7B. In this embodiment which includes rectangular corrugated sheets 202 having integral louvers 208, the flat sheets 204 also have integral louvers 210. As illustrated by the louvers 210, the invention encompasses different louvers of a single sheet or vane being located in different flow channels of the demister 200. As illustrated by the uppermost flat sheet 204 without louvers, the invention does not require all flow channels and/or sheets to be identical.

Figure 8A:
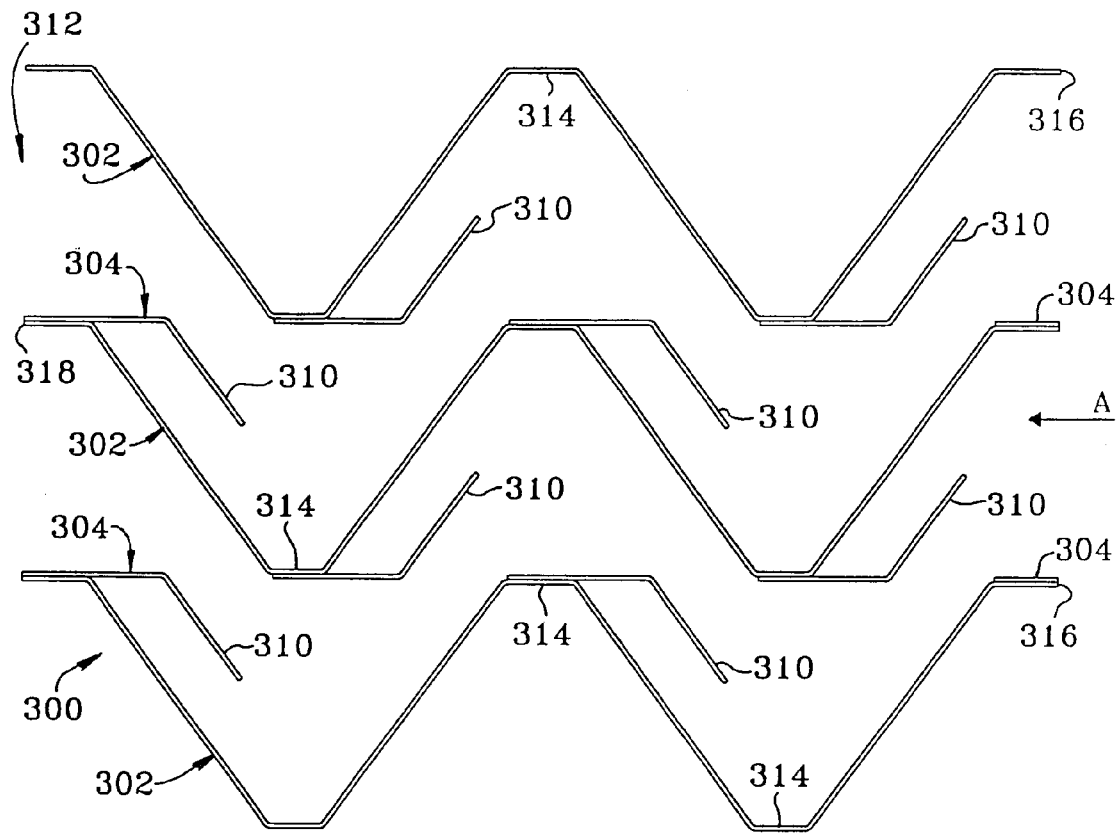
FIG. 8A is a top view of a central section of vane-type mist eliminator according to a third embodiment of the present invention.
Figure 8B:
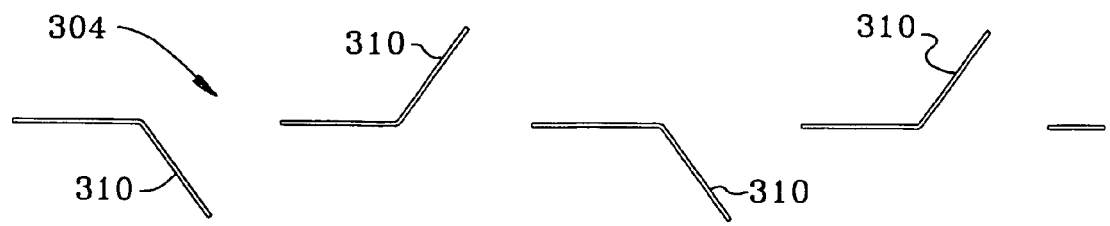
FIG. 8B is an end view of a flat sheet having louvers according to FIG. 8A.

A demister 300, shown in FIG. 8A according to a third embodiment of the invention, includes a plurality of corrugated sheets 302 and a flat sheet 304 layered between each pair of corrugated sheets 302. The corrugated sheets 302 do not include integral louvers or fluid passages and are thus substantially imperforate. The flat sheets 304, best shown in FIG. 8B, include integral louvers 310 slanted in alternating directions to follow the slant of the adjacent corrugations, thereby forming pockets between the louvers 310 and the walls of the corrugated sheets 302. The spaces left by the louvers 310 provide passages for the fluid stream to pass from the leading edges 316 to the trailing edges 318 proximate vapor outlet 312 while the sinusoidal shape of the corrugated sheets 302 and the pockets formed by the louvers 310 cause the stream to change direction several times while passing through the demister 300 and thus cause the liquid to be de-entrained from the vapor. Similar to the first and second embodiments, the stack of layered corrugated sheets 302 and the flat sheets 304 is self supporting and an outer frame is sufficient to hold the sheets together. As in the other embodiments, the sheets may be placed into the outer frame or the outer frame may be formed around the layered sheets. No spacers, welding or fasteners are required to maintain the spacing of the stacked sheets and/or form the louvers 310.

It should be particularly noted that many further variations of the invention may be imagined. For example, the fluid channels may be formed to prevent the transfer of fluid between the channels within the demister. In other embodiments the sheets may contain perforations to permit fluid to pass between the fluid flow channels. Or, the flat sheets 104a and 104b of the first embodiment may be aligned such that the formation of louvers 110 in adjacent fluid flow channels overlap to permit fluid flow between the fluid channels. In another embodiment wherein fluid flow between adjacent channels is not desired and the louvers 110 overlap to create an opening between adjacent flow channels, a simple remedy is to layer an imperforate flat plate between adjacent flat plates 104a and 104b.

It should be further noted that the fabrication materials of the demister may include metal of standard thickness, ranging from about 7 gauge to about 30 gauge. The thickness of the metal used in a specific application will depend on a number of factors including the strength of the metal and its composition. The fabrication materials may vary widely such as carbon steel, stainless steels, aluminum, titanium, alloys, composites, polymeric materials including reinforced plastic, etc. The apparatus may be fabricated from a single material such as metal of a non-standard gauge, or, alternatively, from a combination of materials. The thickness of the material(s) may vary within a demister. For example, the sheets may be of one thickness and the frame of a different thickness. The sheets may also vary in thickness. The materials are chosen to be compatible with the vapor and liquid compositions, other materials used in the specific application, and the operating conditions.

The invention claimed is:

1. A vapor-liquid separating device, comprising:
   a) a plurality of corrugated sheets, each of said corrugated sheets comprising at least one integral louver;
   b) a substantially flat sheet layered between each pair of said corrugated sheets; and
   c) an outer frame holding the layered corrugated and flat sheets together.

2. The device of claim 1 wherein the corrugated sheets, flat sheet, and integral louvers define self supporting fluid flow channels.

3. The device of claim 2 further comprising an inlet, a vapor outlet, and a liquid outlet wherein the fluid flow channels provide fluid communication between the inlet and the outlets.

4. The device of claim 3 further comprising a flow manipulator adjacent one of the group consisting of the inlet, vapor outlet, liquid outlet, and combinations thereof.

5. The device of claim 3, further comprising a substantially imperforate plate that extends over an upper portion of the vapor outlet.

6. The device of claim 1, wherein each of the integral louvers defines a pocket between the corrugated sheet and the proximate flat sheet.

7. The device of claim 1, wherein said flat sheet comprises at least one integral louver, the at least one flat sheet integral louver defining an opening through the flat sheet.

8. The device of claim 7, further comprising a second flat sheet between each pair of the corrugated sheets, the second flat sheet comprising at least one integral louver, the at least one second flat sheet integral louver defining an opening through the second flat sheet.

9. The device of claim 7, wherein the corrugated sheet integral louvers are directed in a first direction and the flat sheet integral louvers are directed in a second direction that is opposite to the first direction.

10. A plurality of devices of claim 1, wherein the outer frames are configured to interlock with each other.

11. A vapor-liquid separating device, comprising:
   a) a plurality of substantially flat sheets, wherein each of the flat sheets comprises at least one integral louver, the at least one integral louver defining an opening through the flat sheet;
   b) a corrugated sheet layered between each pair of the flat sheets; and
   c) an outer frame holding the layered flat and corrugated sheets together.

12. The device of claim 11 wherein the flat sheets, corrugated sheet, and integral louvers define self supporting fluid flow channels.

13. The device of claim 11, wherein each of the flat sheets comprises a plurality of integral louvers that are directed to substantially follow the contours of an adjacent corrugated sheet.

14. The device of claim 1 further comprising an inlet and a vapor outlet, wherein the corrugated sheets have a leading edge proximate the inlet and a trailing edge proximate the vapor outlet.

15. The device of claim 1 wherein the at least one integral louver defines an opening through the corrugated sheet.

16. The device of claim 11, wherein the corrugated sheet contacts both flat sheets of the pair of flat sheets.

17. A vapor-liquid separating device having an inlet and a vapor outlet comprising:
   a) at least two corrugated sheets and at least two substantially flat sheets, the sheets having a leading edge and a trailing edge;
   b) at least one integral louver in at least one of the sheets, the integral louver defining an opening through the sheet;
   c) the sheets being layered;
   d) an outer frame holding the layered sheets together; and
   e) at least one tortuous fluid flow channel through the device from the inlet to the vapor outlet, the leading edge of the sheets proximate the inlet and the trailing edge of the sheets proximate the vapor outlet, the fluid flow channel comprising the opening through the sheet.

18. The device of claim 17 wherein at least one of the flat sheets comprises a first integral louver and at least one of the corrugated sheets comprises a second integral louver.

19. The device of claim 17, wherein the sheets are layered to provide at least one flat sheet between a pair of adjacently layered corrugated sheets.

20. The device of claim 19, wherein the at least one flat sheet comprises the at least one integral louver, the at least one tortuous fluid flow channel passing through the at least one flat sheet.

21. The device of claim 17, wherein the sheets are layered to provide one corrugated sheet between a pair of adjacently layered flat sheets.

22. The device of claim 21 wherein the one corrugated sheet comprises the at least one integral louver, the corrugated sheet contacts both flat sheets of the pair of adjacently layered flat sheets, the at least one tortuous fluid flow channel passing through the one corrugated sheet.

* * * * *

UNITED STATES PATENT AND TRADEMARK OFFICE
CERTIFICATE OF CORRECTION

PATENT NO. : 7,618,472 B2  Page 1 of 1
APPLICATION NO. : 11/305068
DATED : November 17, 2009
INVENTOR(S) : Agnello et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 787 days.

Signed and Sealed this

Twenty-sixth Day of October, 2010

David J. Kappos
*Director of the United States Patent and Trademark Office*